Figure 1:
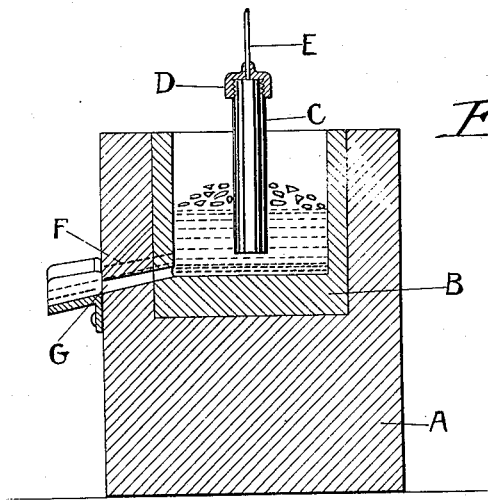

T. B. ALLEN.
MANUFACTURE OF ABRASIVE MATERIALS.
APPLICATION FILED APR. 19, 1915.

1,187,225.

Patented June 13, 1916.

WITNESSES.
N. R. Tyndall.
E. P. Hall.

INVENTOR.
T. B. Allen.
BY J. Edward Maybee.
ATTY.

UNITED STATES PATENT OFFICE.

THOMAS B. ALLEN, OF TORONTO, ONTARIO, CANADA, ASSIGNOR TO GENERAL ABRASIVE COMPANY, OF NIAGARA FALLS, NEW YORK.

MANUFACTURE OF ABRASIVE MATERIALS.

1,187,225.  Specification of Letters Patent.  Patented June 13, 1916.

Application filed April 19, 1915. Serial No. 22,468.

*To all whom it may concern:*

Be it known that I, THOMAS BOLES ALLEN, of the city of Toronto, county of York, and Province of Ontario, Canada, a citizen of the United States of America, have invented certain new and useful Improvements in the Manufacture of Abrasive Materials, of which the following is a full, clear, and exact description.

This invention has relation to a process of manufacture of aluminous abrasives i. e. containing alumina as the essential constituent by the fusion of minerals, such as bauxite, largely consisting of alumina.

Different processes have been suggested for the manufacture of aluminous abrasives but in all processes heretofore used there are certain disadvantages which mitigate against a proper or economical manufacture.

Processes involving a discontinuous or intermittent form of operation are not economical since from a constructional point of view it is impossible to design a furnace having a greater electrical efficiency than 35% to 40%, and therefore the loss of heat due to the alternate cooling and reheating of the furnace, such as takes place in all such discontinuous processes, involves a large expenditure of electrical energy relative to that actually utilized. In the manufacture of these aluminous abrasives it is usually considered preferable to use bauxite as the source of alumina. Red bauxite consisting of 55%–60% alumina, 22%–25% oxid of iron, 3%–5% silica and 2%–4% oxid of titanium, (the balance being chemically combined and uncombined water,) is preferably used. In the manufacture of these aluminous abrasives it is usually preferable to produce a material having an alumina content of 90% or greater and in order to effect this increase in alumina content carbon (in the form of fine metallurgical coke) is added to the preferably previously calcined bauxite. On account of the lower heats of formation of the oxids of iron and silicon, these constituents may be reduced and removed without reduction of the oxid of aluminum. The oxid of titanium may not be reduced to any appreciable extent owing to its high heat of formation and should not be aimed at since, if sufficient carbon is added to effect this reduction of the oxid of titanium, a partial reduction of the oxid of aluminum takes place, which causes the formation of carbid or suboxid of aluminum. The presence of the latter is particularly disadvantageous even in minute quantities as it will cause the total disintegration of the product into an impalpable powder without any abrasive value. It is important therefore to keep the temperature as low as possible and to use the least possible quantity of carbon. In the smelting operation, this reduction of the oxids of silicon and iron and, to a small extent, titanium, causes the formation of an alloy of iron, silicon and titanium which will be called hereafter ferrosilicon. In the discontinuous or intermittent manufacture of aluminous abrasives, this ferrosilicon settles out partially but is to a large extent mixed with the aluminous product. In certain processes recommended no proper separation of this ferrosilicon from the abrasive material is provided for. This causes the abrasive to be of inferior quality and it is absolutely essential therefore that the abrasive be absolutely free from the ferro alloy.

In the manufacture of grinding articles, it is usually the custom to mix with the suitably sized abrasive a mixture of clays and fluxes which on vitrification yield a vitreous or porcelain-like mass. After this mixture is suitably shaped, it is usually heated to a high temperature in a potter's kiln. If the abrasive contains any quantity of ferrosilicon the proper bonding of the abrasive with the bond is prevented and consequently an article of inferior strength is produced. Moreover the presence of the ferrosilicon prevents an article of homogeneous properties being produced which is particularly disadvantageous for grinding purposes. It is consequently essential that the most perfect separation of the abrasive from the ferrosilicon be made. None of the discontinuous processes permit of a perfect separation being made as the separation takes place after the abrasive is cooled and crushed.

In the manufacture of aluminous abrasives by the discontinuous process the bauxite is smelted in the furnace the smelting operation being continued until the furnace is filled. The electrical energy is then shut off and the mass allowed to cool. The melting point of the purified bauxite being very high 2000° C. to 2100° C. and moreover the heat being all developed at the points of contact of the electrode and the molten bath, due probably to the molten mass not "wetting" the electrode, there results a very steep temperature gradient from the electrode to the furnace walls and therefore unequal temperature conditions through the melting zone of the furnace. Many different designs of discontinuous furnaces have been devised for remedying this defect but so far without success. The extent to which reduction takes place depends *inter alia*, on the temperature and therefore on account of a varying temperature in the smelting zone there is a varying degree of reduction of the bauxite; the greatest degree of reduction taking place in the immediate vicinity of the electrodes, the least nearest the furnace walls.

The important physical properties of all abrasives are the hardness and the toughness. The first is largely determined by the nature of the body, the latter is however greatly affected by the crystalline structure of the material. This crystalline structure is determined by the temperature and chemical composition of the molten bath and with variable furnace temperatures we have a variation in this extremely important property of abrasive materials *i. e.* the toughness. In making abrasive articles it is extremely important that the toughness or "temper" of the abrasive grains be uniform since it is essential that the articles grind uniformly. Moreover the uniformity of chemical composition is important since the "bonding" of the abrasive grains by means of vitrified bonds is greatly affected by the chemical composition of the abrasive grains. Abrasive articles are valuable in the degree that they are uniform and homogeneous and these two factors are therefore of a great practical value. I have discovered that these difficulties can be obviated by carrying out the smelting process in a continuous manner in a furnace of suitable construction and by tapping the molten abrasive from the furnace so that a thorough mixing of the molten material is secured as hereinafter more specifically referred to.

Figure 2:
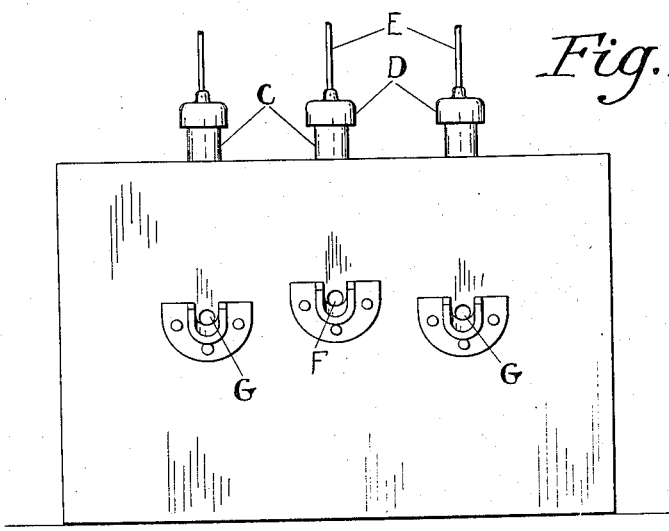

In the annexed drawing Figure 1 is a section and Fig. 2 is a front elevation of a type of furnace suitable for this purpose.

A is a brick wall made of ordinary refractory brick.

B is a carbon lining made from a mixture of coke and tar rammed into place using a temporary form.

F and G are tap holes, F being used for tapping the abrasive, G being used for tapping the ferrosilicon.

C are carbon or graphitized carbon electrodes provided with suitable holders D and connected by suitable cables E to a source of power. At least three electrodes will usually be employed and preferably polyphase current as such is best adapted for use with three or more electrodes. The use of numerous electrodes has a marked effect in producing as nearly equal temperature conditions throughout the mass as possible.

The bauxite is preferably calcined, using a rotary kiln heated by producer gas or otherwise. To 100 parts of weight of calcined bauxite about 9 parts of metallurgical coke is added. The bauxite and coke should be both ground fine and intimately mixed. The mixture is charged into the furnace and is melted by the electrically developed heat. The operation is continued until 7000 or 8000 pounds of mixture is melted and reduction has taken place, which can be judged by the appearance of the molten mass. As soon as reduction is complete and sufficient time elapsed for the settling of the ferrosilicon, the abrasive in molten form is removed by means of the tap hole F and cast into ingots of a size determined by the qualities desired in the abrasive produced. After its removal the ferrosilicon is tapped out by means of the tap hole G. The process is then repeated before the furnace cools. The abrasive after cooling is crushed up into suitably sized grains and is then in shape to be used for abrasive purposes.

By means of the above described process I gain a great deal in the electrical efficiency and consequently the economy of the process, and I also obtain a very satisfactory separation of the ferrosilicon and the abrasive. Moreover on account of the mixing action caused by the removal of the molten abrasive from the furnace into tapping luggies or molds, the inequalities in the chemical composition and the temperature of the molten material are largely equalized and the material produced is characterized by great homogeneity of crystalline structure and uniformity of chemical composition.

In carrying out my invention I have found that I can control the toughness or "temper" of the abrasive by the quantity of molten abrasive tapped from the furnace at one time and further by the dimensions of the ingots produced.

Due to the varied kinds of work which an abrasive article has to do and the variable conditions under which grinding is done, it is important to have the "temper" of the abrasive grains under control and I secure this important advantage by altering the conditions under which the tapped molten material cools.

By altering the conditions I can either obtain products in which crystallization has gone on to completion with the result that a rather brittle abrasive grain is produced or the crystallization may have just well developed when an abrasive grain of much greater toughness is produced, or any intermediate condition may be obtained.

In no case is it desirable to cool rapidly or freeze the product. The ingots, therefore, will usually be of comparatively large size so that cooling is comparatively slow.

What I claim as my invention is:

1. The process of making abrasive materials, which consists in fusing bauxite with carbonaceous material by electrically developed heat in a continuous manner at a temperature only just sufficient to fuse the bauxite, the abrasive and ferrosilicon being separately removed from the furnace while in a state of fusion and the abrasive cast in ingots of a size determined by the qualities desired in the abrasive and of sufficient size to prevent freezing of the product.

2. The process of making abrasive materials which consists in fusing calcined bauxite containing iron oxid, silica and titanium oxid with carbonaceous material by electrically developed heat at a temperature only just sufficient to fuse the bauxite and removing the abrasive and the ferrosilicon separately from the furnace while in a state of fusion, the carbonaceous material being limited to a quantity sufficient to reduce the iron oxid, silica and part only of the titanium oxid, and the abrasive cast in ingots of a size determined by the qualities desired in the abrasive and of sufficient size to prevent freezing of the product.

3. The process of making abrasive materials which consists in fusing calcined bauxite containing iron oxid, silica and titanium oxid with carbonaceous material by electrically developed heat at a temperature only just sufficient to fuse the bauxite, and removing the abrasive and the ferrosilicon separately from the furnace while in a state of fusion by tapping at different levels, the carbonaceous material being limited to a quantity sufficient to reduce the iron oxid, silica and part only of the titanium oxid, and the abrasive cast in ingots of a size determined by the qualities desired in the abrasive, and of sufficient size to prevent "freezing" of the product.

Signed at Toronto this 13th day of April, A. D. 1915, in the presence of the two undersigned witnesses.

THOMAS B. ALLEN.

Witnesses:
J. EDW. MAYBEE,
E. P. HALL.